United States Patent
Nelson et al.

(10) Patent No.: US 6,498,897 B1
(45) Date of Patent: Dec. 24, 2002

(54) MEDIA SERVER SYSTEM AND METHOD HAVING IMPROVED ASSET TYPES FOR PLAYBACK OF DIGITAL MEDIA

(75) Inventors: Michael N. Nelson, Danville, CA (US); Lakshminarayanan Gunaseelan, Milpitas, CA (US)

(73) Assignee: Kasenna, Inc., Mountain View, CA (US)

( * ) Notice: Subject to any disclaimer, the term of this patent is extended or adjusted under 35 U.S.C. 154(b) by 0 days.

(21) Appl. No.: 09/085,565

(22) Filed: May 27, 1998

(51) Int. Cl.$^7$ .............................. H04N 7/26; H04N 5/85; H04N 5/91
(52) U.S. Cl. ........................... 386/125; 386/109; 386/68
(58) Field of Search ........................... 386/125, 68, 69, 386/67, 46, 109, 111, 112, 6, 7, 1, 45, 126, 70, 83, 27, 33, 124; 360/32; H04N 7/26, 5/85, 5/91

(56) References Cited

U.S. PATENT DOCUMENTS 5,778,181 A * 7/1998 Hidary et al. .......... 395/200.48
6,031,960 A * 2/2000 Lane .......................... 386/68

* cited by examiner

*Primary Examiner*—Robert Chevalier
(74) *Attorney, Agent, or Firm*—R. Michael Ananian; Dorsey & Whitney LLP

(57) ABSTRACT

A media server system and method are disclosed for playback of digital media. For playback, header information associated with a complex asset is received. The header information comprises information for initializing a decoder (56) for playback of the complex asset. Artificial headers (54) for the complex asset are then created using the header information. A digital packet stream for the complex asset is received and passed decoder (56) for playback. During playback, artificial headers (54) are injected as appropriate for initializing the decoder (56) for playback of the complex asset. In one implementation, the complex asset can be a clip asset (100), a parallel asset (102), a sequential asset (106) or a composite asset (110).

16 Claims, 3 Drawing Sheets

FIG. 7
FIG. 9
FIG. 8
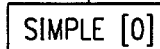 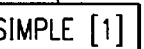 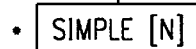
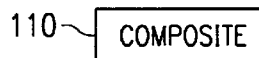
FIG. 10
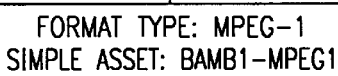 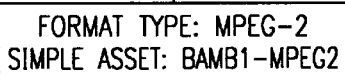 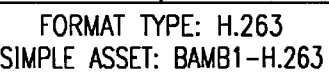
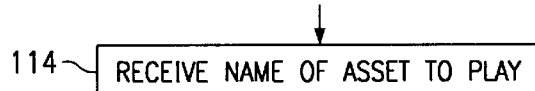
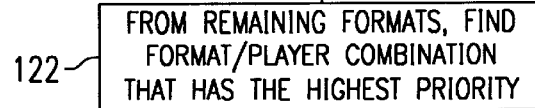
FIG. 11

MEDIA SERVER SYSTEM AND METHOD HAVING IMPROVED ASSET TYPES FOR PLAYBACK OF DIGITAL MEDIA

TECHNICAL FIELD OF THE INVENTION

The present invention relates in general to the field of digital media and, more particularly, to a media server system and method having improved asset types for playback of digital media.

BACKGROUND OF THE INVENTION

Digital media files are increasingly used to record a variety of media assets for playback on computer systems. Digital media assets are also delivered across networks in a real-time stream. In both cases, digital media data is typically organized with a header followed by a large number of data packets. The header and data packet components are generally separated by a packet start code. A decoder or player is a software or hardware component, such as a software application or hardware card, that receives the digital media data in this digital packet format and renders it for playback such as a displayable image, playable audio or a combination of the two. The header information is important in order to properly initialize the decoder for the media format. If the header information gets garbled or dropped, nothing will get played correctly by the decoder.

One distribution method used for digital media files is a media server which can hold a large repository of media files. The media files can be streamed as digital packets across a network connection such as a local area network, wide area network or the Internet, to client systems for playback. Typically, the media server divides the media files into data packets which are then delivered to the client system across the network connection. In order to provide continuous playback of digital media data, these packets need to arrive within a certain time range. Packets received after or before this time range typically can not be used to display or play the digital media data.

In general, reliable network protocols such as TCP (Transport Control Protocol) are not appropriate to guarantee timely delivery of packets. Consequently, UDP (Unreliable Datagram Protocol) is typically used as a delivery mechanism for the packets. Using UDP, however, packets may be lost and garbled (out of sequence) before they reach the client system destination. Conventional media servers address problems with packet delivery by using feedback information communicated by the client system during playback. However, such schemes are inefficient and can slow down the server when a number of client systems are actively playing media files.

Another means for addressing problems with packet delivery during playback is implemented by the MEDIABASE 1.0 media server available from SILICON GRAPHICS. This media server used a header injection technique where header information could be provided to a decoder separately from the streamed packets to allow decoder initialization to be more robust. In MEDIABASE 1.0, playback was supported only for simple assets consisting of single files that contain the video and/or audio that is to be delivered. Examples of simple assets include an MPEG-1 system stream that contains audio and video, an MPEG-1 elementary video stream (video only), an MPEG-1 elementary audio stream (audio only), and an MPEG-2 transport stream (video and audio combined). The header injection involved associating metadata with each simple asset that included the headers that were needed to play the given asset type.

SUMMARY OF THE INVENTION

In accordance with the present invention, a media server system and method having improved asset types are disclosed for playback of digital media and provide advantages over conventional digital media server systems.

According to one aspect of the present invention, for playback, a media server system and method are disclosed for playback of digital media. For playback, header information associated with a complex asset is received. The header information comprises information for initializing a decoder for playback of the complex asset. Artificial headers for the complex asset are then created using the header information. A digital packet stream for the complex asset is received and passed through a decoder for playback. During playback, artificial headers are injected as appropriate for initializing the decoder for playback of the complex asset. In one implementation, the complex asset can be a clip, a parallel, a sequential or a composite asset.

According to another aspect of the present invention, a method is provided for playback of a composite asset. The composite asset has a plurality of assets associated with it. Each of the associated assets encodes a common media title in a different format. For playback, a name of the composite asset is received, and format information for the composite asset is obtained. The formats that exceed an available bitrate on the client system are then discarded. From remaining formats, a format/player combination is selected that has a highest priority. Then, the selected player is launched to playback the associated asset that encodes the common media title in the selected format.

A technical advantage of the present invention is the use of extracted header information to create artificial headers that can be injected as appropriate for playback of complex assets, including clip, parallel, sequential and composite assets.

The extracted header information and artificial header allows the client side flexibility in handling initialization of the decoder for playback of these complex asset types. The client side media control application can work with a variety of decoders on many platforms and can provide high quality, robust playback with a rich feature set. Features can include rewind and fast forward functions and the handling of services such as live cast, web cast, delay TV and video bookmarks.

Another technical advantage of the present invention is the provision of a composite asset type that allows one asset name to refer to multiple encodings of the same asset. Also, the client side media control application is enabled to select the appropriate format and applications for playback based upon the specific characteristics of the client system.

Other technical advantages should be readily apparent to one skilled in the art from the figures, description, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 4 is a flow chart of one embodiment of a method for installing a media file on a media server;

FIG. 7 is a diagram of one embodiment of a clip asset type;

FIG. 8 is a diagram of one embodiment of a parallel asset type;

FIG. 9 is a diagram of one embodiment of a sequential asset type;

FIG. 10 is a diagram of one embodiment of a composite asset type; and

FIG. 11 is a flow chart of one embodiment of a method for initiating playback of a composite asset type.

DETAILED DESCRIPTION OF THE INVENTION

Figure 1:
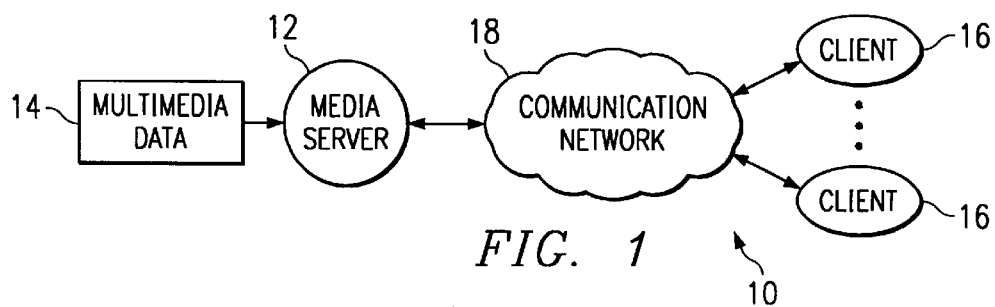
FIG. 1 is a diagram of one embodiment of a media server environment.

FIG. 1 is a diagram of one embodiment of a media server environment, indicated generally at 10. Environment 10 includes a media server 12 that has access to digital media data 14. Media server 12 can be connected to a plurality of client systems 16 across a communication network 18. Communication network 18 can be supported by a variety of connection types such as a local area network, wide area network, and the Internet. In general, a user of a client system 16 can send a request to media server 12 across communication network 18. The request can identify a digital media title that the user desires to playback on client system 16. Media server 12 responds by accessing the appropriate media file from digital media data 14, separating the media file into data packets and streaming data packets to client system 16. Client system 16 receives the data packets and uses a decoder to process the data packets and playback the digital media data. There are a number of commercially available media server products which generally operate within an environment like that of FIG. 1.

Further, although not shown in FIG. 1, there are media server environments that provide real-time streaming of digital media where the source is live encoded and transmitted across the network to client systems. Thus, rather than digital media data originating from a file stored on a storage device, the data originates from a live feed. The digital media is then often multicast to clients systems which each use decoders to process the data packets and playback the digital media data.

Problems with conventional media server products can be solved and advantages provided using a header injection technique. In particular, appropriate header injection can better initialize decoders for playback and support a number of improved complex asset types, including clip, parallel, sequential and composite assets which are discussed below. These types of complex assets are not supported by conventional media servers. One media server product that implements such improved asset types and uses a header injection technique is the MEDIABASE 2.0 product available from SILICON GRAPHICS of Mountainview, Calif.

Installation of a Media File

Figure 2:
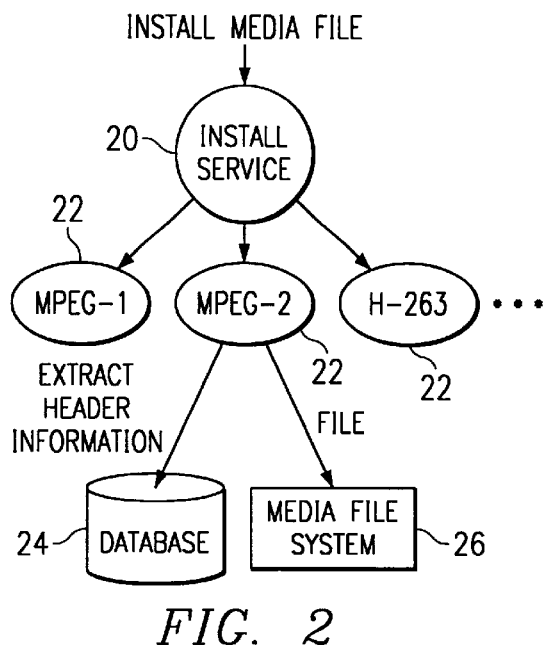
FIG. 2 is a diagram of one embodiment of separately storing media metadata during installation of a media file on a media server.

FIG. 2 is a diagram of one embodiment of separately storing media metadata during installation of a media file on a media server. As shown in FIG. 2, a command to install a digital media file on the media server can be handled by an install service process 20. After receipt of an install command, install service 20 processes the media file according to a media format of the media file. For example, the media file can be in MPEG-1, MPEG-2, MPEG-4, H.263 or other media format. In particular, install service 20 can maintain a list of extractors 22 and can call the extractor 22 that is appropriate for the particular media format. The extractor process 22 then extracts header information from the media file and stores the header information in database 24 along with server information such as the filename, location, format type, etc. This information can be referred to collectively as media metadata associated with the media file. It should be understood that an analogous process could be used to extract such metadata from a real-time feed, as well.

In the embodiment of FIG. 2, the extractor process 22 also installs the media file within a media file system 26. With respect to the media file system, the media metadata in database 24 can generally be organized within an asset table indexed by the asset name. The entry in the asset table can provide such information as the location of the file, the format type, the header information and other information about the media file. As should be understood, the header information extraction is flexible and can allow processing of arbitrary digital media types (e.g., MPEG-1, MPEG-2, MPEG-4, H.263, RealVideo, and other packetized forms of digital media).

Figure 3:
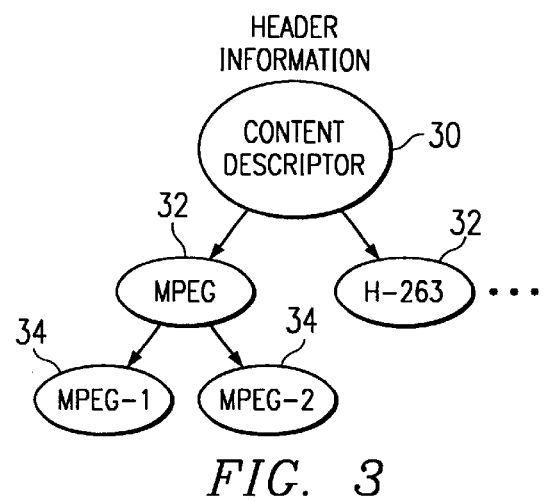
FIG. 3 is a diagram of one embodiment of the structure of header information extracted into a server database.

FIG. 3 is a diagram of one embodiment of a structure of header information extracted and stored in a database. The header information can be organized, for example, into levels as shown in FIG. 3. A first level 30 can include content descriptor information common to all media format types. Subsequent levels then add more detailed information as appropriate for the media format. For example, a second level 32 can include information specific to a category of format types such as MPEG and H.263. A third level 34 can include further information specific to particular format type such as MPEG-1, MPEG-2 and MPEG-4 under the MPEG format type. The following table provides an example of header information that can be extracted and stored for some of these digital media formats.

TABLE 1

| LEVEL 1 | CONTENT DESCRIPTOR | | |
|---|---|---|---|
| | bitrate rate | | |
| | aspect ratio | | |
| | display format (NTSC/PAL) | | |
| LEVEL 2 | H.263 | MPEG | |
| | sync mark | system header | |
| | video PID | pack header | |
| | audio PID | | |
| LEVEL 3 | — | MPEG-1 | MPEG-2 |
| | | video sequence | PES |
| | | header | packets |
| | | audio header | |

Thus, in this example, the information stored for an MPEG-2 format media file includes all the elements of LEVEL 1, the MPEG elements of LEVEL 2, and the MPEG-2 elements of LEVEL 3.

FIG. 4 is a flow chart of one embodiment of a method for installing a media file on a media server. In step 60 of FIG. 5, an install command is received by the media server. The media server then extracts header information from the media file in step 62. As discussed above, the extracted header information can comprise information needed to build an artificial header for initializing a decoder for playback of the media file and depends upon the format of the media file. In step 64, the media server stores the header information in a database along with server information (e.g., file name, file location, format type, etc.) and/or other media metadata. Then, in step 66, the media server installs the media file into the media file system.

By performing header information extraction and storing of media metadata during the install process, the media server is prepared to quickly access and send the header information to a requesting client system. This allows the media server to distribute some of the processing load involved in playback thus increasing the performance and scalability of the media server. Header information extraction can also be implemented for a real-time feed from an encoded source. In such case, however, there may not be installation of a digital media file. Rather, the header information is extracted from the streamed data and passed to the client system. Once at the client system, the header information can be used in the same manner.

Playback Using Header Injection

Figure 5:
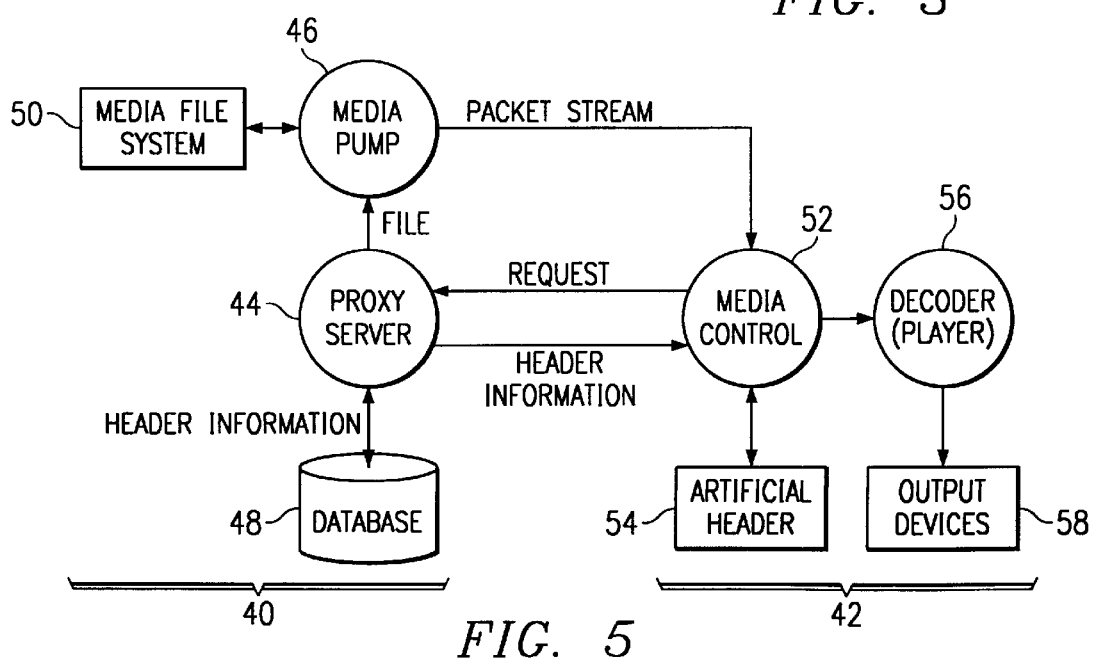
FIG. 5 is a diagram of one embodiment of sending a media file to a client system for playback.

FIG. 5 is a diagram of one embodiment of sending a media file to a client system for playback. As shown, the environment of FIG. 4 includes a media server side 40 and a client system side 42. On media server side 40, a proxy server 44 can be used to receive a request from client system side 42 for playback of a media file. Proxy server 44 is used because it can be implemented with a cache in memory to provide quick access to header information once retrieved. After receiving the request, proxy server 44 passes the media file name to a media pump 46. Proxy server 44 also checks whether header information for that media file is already stored in the memory cache. If not, proxy server 44 retrieves header information for the media file from database 48. As discussed above, this header information can be extracted from the media file using an extraction process during the installation of the media file. Once proxy server 44 has the header information stored in the cache, proxy server 44 communicates the header information to client system side 42 using, for example, a reliable protocol built upon UDP.

After receiving the name of the requested media file from proxy server 44, media pump 46 retrieves the media file from media file system 50. Media pump 46 then processes the media file, prepares packets for transmission and streams the packets to client system side 42. As mentioned above, other media server environments involve the streaming of real-time feeds from an encoded source. In such environments, the encoded live feed is processed rather than a media file. However, in both cases, the client system can receive header information separate from the encoded packet stream.

On client system side 42, a media control application 52 receives the header information from proxy server 44. Media control application 52 can, for example, be a plug-in added to a web browser such as NETSCAPE NAVIGATOR. Media control application 52 uses the header information to create an artificial header 54 which can be stored in memory for quick access by media control application 52. Media control application can inject artificial header 54 into an appropriate decoder 56 to initialize decoder 56 for playback of the media file as appropriate for decoder 56 and for the format of the digital media. For example, media control application 52 can inject the artificial header and can then scan the packet stream from media pump 46 for a packet start code. In this case, when media control application 52 identifies a packet start code, media control application can pass the packet stream to decoder 56. Decoder 56, having been properly initialized, can process the packet stream and provide media output to output player 58 which presents the digital media to the user. Depending on the decoder/player, in some cases, media control application 52 first scans for the packet start code and then inject headers. This is needed, for example, for some MPEG-1 decoders because they expect a video sequence header (VSH) in the first video packet that they decode. If the first video packet identified in the packet stream does not contain a VSH, then a header can be injected into the first video packet.

Further, in the case of playback of complex assets, artificial headers 54 can be injected when appropriate into the decoder 56. This allows a smooth playback of the digital media data associated with complex assets, such as clip, parallel, sequential and composite assets.

In operation, when a client system 42 sends a request to play a media file (e.g., a movie title) media server 40 sends back header information that has previously been extracted from the requested media file. A separate reliable network protocol can be used to send both the client request to media server 40 and the header a information from media server 40 to client system 42. In one implementation, this protocol is a reliable network protocol developed to carry the information on top of UDP and which uses an acknowledgment from the client side to insure that the header information was received. Once received, the header information can be stored in the process memory of client system 42 and used to create artificial header packet 54. As mentioned above, this artificial header packet 54 can then be used to properly initialize the decoder 56. In one case, the decoder 56 is initialized, and the packets from the UDP packet stream are then scanned for a packet start code (PSC). When a packet start code is detected, the packets are passed to decoder 56. In this manner, decoder 56 can be properly initialized to receive the data in the correct format. Decoder 56 can then operate in conventional fashion.

If a small number of data packets get lost or corrupted, decoder 56 is often capable of handling the problem, and the user will only see minor glitches in the playback. However, if the data losses are substantial, decoder 56 might shut itself off. In the case of such a large loss of data, the header injection technique can be used to re-initialize the decoder 56. The artificial header 54 remains available to media control application 52 and can be injected into the stream. For example, the streamed data can then be re-scanned to find a proper packet start code and packets can be passed to decoder 56.

Figure 6:
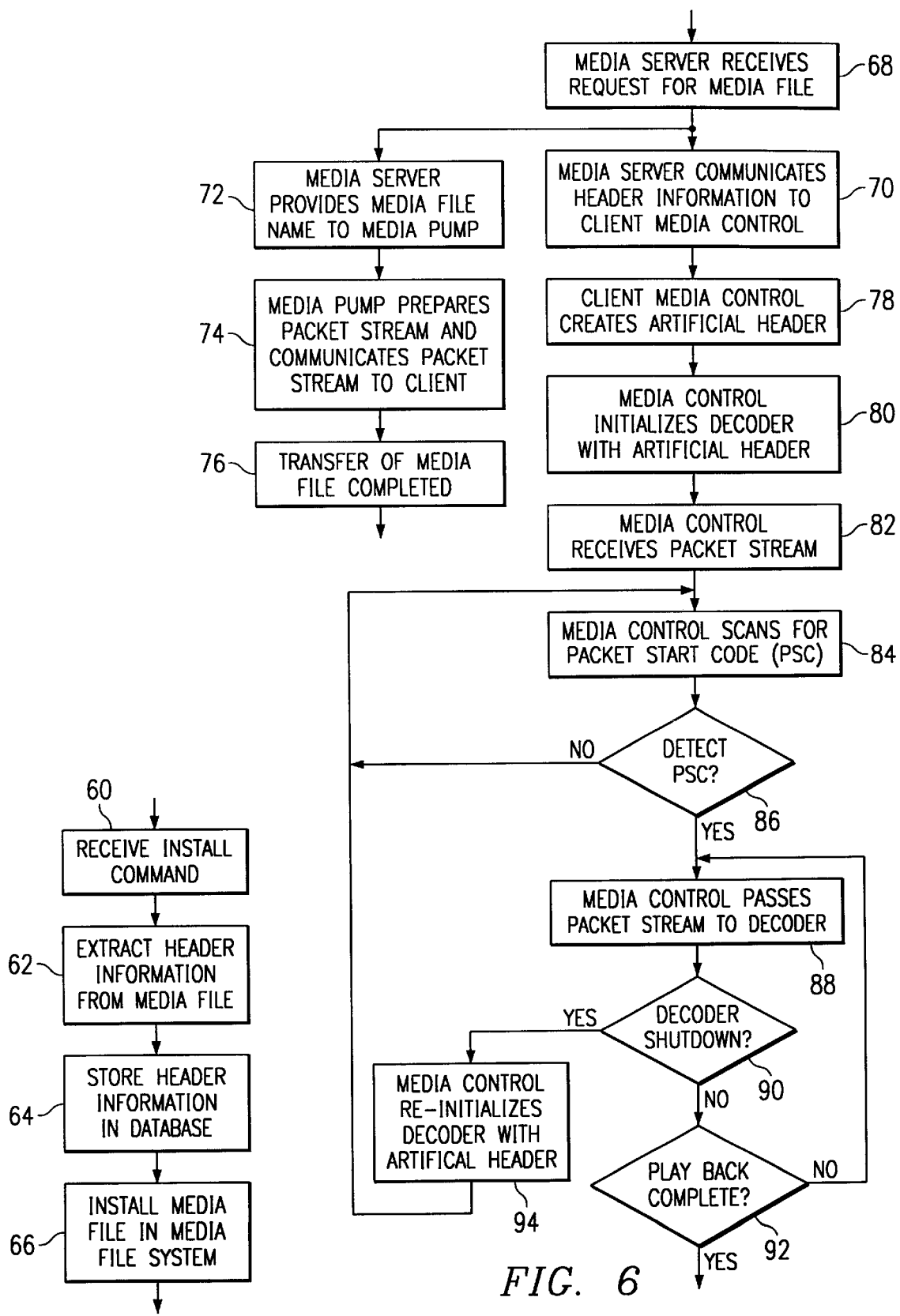
FIG. 6 is a flow chart of one embodiment of a method for playback of a media file from a media server.

FIG. 6 is a flow chart of one embodiment of a method for playback of a media file from a media server. In this embodiment, a proxy server receives a request for playback of a media file in step 68. Then, in step 69, the proxy server checks whether media metadata for the media file is stored in its cache. If not, in step 70, the proxy server retrieves the media metadata from the database and stores it in the cache. In one implementation, if the cache is full, data associated with the least recently requested media file is purged from the cache to make room. In step 71, the proxy server then communicates header information to the requesting client media control application.

In step 72, the proxy server provides the media file name, location and other server information to a server side media pump. In step 74, the media pump accesses the media file and prepares the packet stream. Then, in step 75, the media pump sends the packet stream to the requesting client side. In step 76, the media pump can determine whether the packet stream has ended or has been stopped by the client side. The sending of the packet stream can continue until one of these events occur.

On the client side, in step 78, the media control application creates an artificial header using the header information received from the proxy server. This is referred to herein as an "artificial" header because it is separate from the media file (or live feed) with which the header is typically located. In step 80, the media control application can initialize the appropriate decoder with the artificial header. Because of the speed with which this can occur, the initialization should be complete prior to receipt of the packet stream from the media pump. In step 82, the media control application receives the packet stream from the media pump. In step 84, the media control application scans for a packet start code (PSC). If, in step 86, a packet start code is not detected, the media control application continues to scan in step 84.

Once a packet start code is detected, in step 88, the media control application passes the packet stream to the decoder. The decoder then processes and plays back the streamed packets. The media control application can remain in the loop with the decoder and monitors any error conditions. In step 90, the media control application checks for a decoder shutdown. If none, then the media control application checks for playback to be completed in step 92. If not, then the decoder continues to process the packet stream. If there is a decoder shutdown for some reason, such as loss of too many packets, then the media control application re-initializes the decoder by injecting the artificial header in step 94 and returns to step 84 to scan for the next packet start code.

Complex Asset Types

One limitation of conventional media servers and players is an inability to handle complex assets. Rather, media servers generally handle only simple assets. The term simple assets can refer to digital media assets that have headers and a duration and whose content is constrained in a single bitstream. For example, an MPEG-1 movie whose audio and video content are combined in a single byte-stream is as a simple asset. On the other hand, complex asset types can refer to digital media assets that are not simple assets and which comprise subsets or combinations of assets. For example, complex assets can include the clip, parallel, sequence and composite assets which are described below with respect to FIGS. 7–11.

Conventional systems are able to initialize a decoder for playback of simple assets, but are unable to do so for playback of complex assets. However, using appropriate header injection, complex asset types can be supported by the media server and playback application. In order to support complex asset types, the extracted content descriptors returned from the media server when an asset is opened are expanded. For example, rather than being a single object, the content descriptors can be an array of arrays. In one embodiment, the first dimension of the array is which element of the sequence the asset is and the second dimension is which element in the parallel that the asset is. For example, assume there is an asset that is a sequential asset that contains four parallel assets to be played in series. Assume also that each of the parallel assets contains a video and an audio asset that are to be played in parallel. Then there could be the following array of content descriptors:

TABLE 2

ContentDescriptors *ContentDescriptors [4] [2]
ContentDescriptors[0] => Content descriptors for the
first parallel
    ContentDescriptors[0] [0] is the content descriptor
    for the video.
    ContentDescriptors[0] [1] is the content descriptor
    for the audio.
ContentDescriptors[1] => Content descriptors for the
second parallel TABLE 2-continued ContentDescriptors[0] [1] is the content descriptor
    for the video.
    ContentDescriptors[0] [2] is the content descriptor
    for the audio.
ContentDescriptors[2] => Content descriptors for the
third paraliel
    ContentDescriptors[0] [1] is the content descriptor
    for the video.
    ContentDescriptors[0] [2] is the content descriptor
    for the audio Each content descriptor can be type narrowed down to the particular type of simple asset that needs to be played. The following can be a definition for a content descriptor.

TABLE 3

```
interface MBContentDescriptor {
    string contentType;              // E.g. "MPEG-1"
    unsigned long long timeOffset;   // Start offset for
clip
    unsigned long long duration;     // Duration of asset
    Ocs::OctetList mediaAttributes;  // Place to put extra
attributes
};
```

An mpeg content descriptor can be a subclass of this type, as shown below.

TABLE 4

```
interface MPEG : MBContentDescriptor {
    float framesPerSecond;
    long bitRate;
    float framesToIFramesRatio;
    float ffSpeedupRate;
    long horizontalSize;
    long verticalSize;
    float aspectRatio;
};
interface MPEG1 : MPEG {
    Ocs: :OctetList packHeader;
    Ocs: :OctetList systemHeader;
    Ocs: :OctetList videoHeader;
    unsigned long audioHeader;
};
```

For complex assets, the decoder or player can be constructed to present the sequential asset to the user as if the asset were one asset. For example, from the user's perspective: 1) the duration of the asset can be the sum of the durations of each asset in the sequence; and 2) a user can jump to any time in the sequential asset and it is up to the player to start the proper asset in the sequence playing. Thus, a user who is playing a sequential asset having a combined length of 30 minutes will think the asset is simply 30 minutes long. If the user wanted to go to time 16:30 into the asset, then the decoder/player could start playing in the middle of a commercial that is located at that point in the sequence.

When a player opens a movie, the player can be given back a movie object. From this movie object it can get an array of array of content descriptors. The player can then go through the array to figure out what type(s) of asset(s) that it will be playing. The player can also get the start offset in case the asset is a clip so that the player can adjust the time accordingly.

Once the asset starts playing, the player can select the first set of content descriptors (only one content descriptor if the first asset in the sequence is a simple and not a parallel). The player can then narrow these content descriptors to the proper type and then inject the headers to get the asset to play. Once the end of the first asset in the sequence is reached, the movie library runtime can return a status back to the player to indicate that the current asset in the sequence is done. At this point the player can advance to the next set of content descriptors, inject the appropriate headers and start the decoder going again. The player can continue in this manner until the end of the last asset is reached.

In general, the enhanced content descriptor scheme adds support for clips, parallels, sequentials, composites and other complex assets. The array of array of content descriptors, for example, can give the player sufficient information to select the appropriate headers to inject when each element of sequence or other complex asset is played. It also gives sufficient information to the player to allow a player to be constructed that will give the appearance of a seamless stream being played to the user. However, in some circumstances, unless the assets are properly constructed, the playback may not be completely seamless. For example, if a sequence contains of both MPEG-1 and MPEG-2 assets then a decoder reset may be necessary to allow the types to be played in sequence. However, if the same format is used, then the playback can more readily be made to be seamless.

FIG. 7 is a diagram of one embodiment of a clip asset type, indicated generally at 100. Clip asset 100 can be a subset of a simple asset having a start time and a duration within the simple asset. Thus, a clip asset 100 can be a reference to a simple asset (which provides audio/video headers and duration) with the addition of a starting offset and a duration. For example, if the video Bambi has been installed and has a duration of 90 minutes, there could be a clip asset of Bambi that starts at offset 10 minutes and runs for 40 minutes.

In order to play a clip asset 100, a player/decoder can inject the same headers that are injected when playing the simple asset. However, with a clip asset 100, the headers are crucial since the clip asset 100 can point to the middle of the video or audio. Since the clip asset 100 can point to the middle, the packet stream is likely not to have the correct headers available right away. Thus without injecting appropriate headers, the clip would be unplayable.

FIG. 8 is a diagram of one embodiment of a parallel asset type, indicated generally at 102. As shown, a parallel asset 102 can comprise multiple simple assets 104 that are delivered "in parallel" (at the same time). An example of a parallel asset 102 is an H.263 video simple asset and G.723 audio simple asset. These two simple assets need to be delivered to the client player at the same time so that the video and audio can be played simultaneously. However, both the audio and video are in separate files and hence are separate simple assets 104. In order to play the parallel asset 102, appropriate headers for each of the streams can be injected into the player.

FIG. 9 is a diagram of one embodiment of a sequential asset type, indicated generally at 106. Sequential asset 106 can comprise a list of simple assets, clip assets, or parallel assets 108 that need to be delivered in sequence (serially one right after the other). An example use of this would be for commercial insertion within playback. For example, a show of SEINFELD could be stored as a simple asset and have associated commercials stored as simple assets. Then, sequence could be created that consisted of each of the simples a desired order. For example, the following sequence could be defined.

TABLE 5

Simple: Seinfeld episode: duration 28 minutes
Sequential: NBC Thursday 9 to 9:30
Clip: Seinfeld intro (reference to Seinfeid episode, start offset 0 seconds, duration 60 seconds)
Simple: Bud Light commercial (duration = 60 seconds)
Ciip: Seinfeld first part (reference to Seinfeid episode, start offset 60 seconds, duration 14 minutes)
Simple: Miller Light commercial (duration = 60 seconds)
Clip: Seinfeld second part (reference to Seinfeld episode, start offset 15 minutes, duration 13 minutes)

If this sequential asset were started from a media server using header injection of appropriate headers, such as MEDIABASE 2.0, the media server could allow these assets to be played one after the other in series. Because each asset could have different headers, the client player/decoder can inject the appropriate headers for each of the assets in the sequence. In this example, each of the SEINFELD clip assets would have the same headers, but the Bud Light commercial and the Miller Light commercial could have separate headers. In fact, for example, the SEINFELD asset could be encoded with MPEG-1, the Bud Light commercial with MPEG-2, and the Miller Light commercial with MPEG-2.

FIG. 10 is a diagram of one embodiment of a composite asset type, indicated generally at 110. A composite asset type 110 can be an asset that has one name but refers to multiple instances, indicated at 112, of the same content with different encodings. Thus, a multi-format or composite asset 110 can comprise multiple assets 112 each representing a particular media content in a different format. In general, any content can be encoded at multiple bitrates and in multiple formats. For example, the movie Bambi could be encoded in 6 Mbit MPEG-2 for high quality playback to those clients that have plenty of bandwidth and a hardware decoder. The movie could be encoded in 1.5 Mbit MPEG-1 for those clients that have less bandwidth and possibly only a software decoder, or 28.8 Kbit H.263 for clients with very little bandwidth.

Composite assets can be defined, for example, as follows.

TABLE 6

```
struct AssetEntry {
    string format;
    Asset asset;
};
typedef list<AssetEntry> AssetEntryList;
interface CompositeAsset : Asset {
    AssetEntryList assetEntries;
};
```

Thus, a composite asset can be an asset that contains a list of asset entries. Each asset entry can have a string that contains the asset format type (e.g. "MPEG-1") and a reference to the underlying asset of the given format type. The assets that are referred to by the composite asset can be any of the four asset types discussed above (simple, clip, parallel, or sequential) or other asset types. On a media server, a composite asset can be created after the assets that it refers to are installed into the system.

As an example, when a client system tries to play Bambi, the player needs to notice that the asset is a composite asset and one of the instances have to be chosen. This can be accomplished by having a player front end process that is launched before any specific player is launched. This front end process, when given an asset name to play, can exam each of the assets in the asset list and find the "best" version to play. The front end process can then launch the appropriate player to play the asset.

This decision can be made, for example, based on the following information: 1) the bit rate that the client is capable of supporting; 2) the types of formats that the client has players installed to play; 3) the relative importance given to each player and each format; and 4) the bit rates and formats that are available for the given asset. The first item (the bit rate) can be stored in persistent storage on the client machine. On a personal computer (PC), the bit rate is often stored in the registry. The second item (the formats that the client can play), and the third item (the relative importance) can be stored, for example, as a prioritized list in persistent storage on the client machine. Each player and format type can be given a priority, and the system can have default priorities that can be modified by the user. When a player is installed, it adds itself to the list. The following is an example list of players, formats, and priorities where higher numbers for priority are better.

TABLE 7

| Name | Priority | Format | Executable |
|---|---|---|---|
| MPEGPlayer | 10 | MPEG-1 | /usr/mbase/sbin/mpegplayer |
| Optiplayer | 20 | MPEG-1 | /usr/mbase/sbin/optiplayer |
| Optiplayer | 30 | MPEG-2 | /usr/mbase/sbin/optiplayer |
| LBRPlayer | 5 | H.263 | /usr/mbase/sbin/lbrplayer |

In this case, the Optiplayer is given the highest priority because it is a high quality hardware decoder and can play both MPEG-1 and MPEG-2. If a client did not have the hardware to support this player, then this player would not be installed, and MPEGPlayer would be used instead. With the current list, MPEG-2 would be played first, MPEG-1 second, and H.263 last. The MPEGPlayer would never get used because the optiplayer is installed. The list of what formats are available can be retrieved from the media server by the front end process. The list can then be combined with the other information to make a decision.

FIG. 11 is a flow chart of one embodiment of a method for initiating playback of a composite asset type. In one embodiment, the method is implemented by a front end process. As shown, in step 114, the process receives the name of the asset to play. In step 116, the process invokes a process on the media server to get format information. Then, in step 118, the process receives a list of formats for the asset. For example, the list can be a list of tuples of the form <name, format, bitrate> for the asset. Thus, in the example above, the formats might be as follows.

TABLE 8

| <Bambi-mpeg1, MPEG-1, 1.5 Mbit> |
| <Bambi-mpeg2, MPEG-2, 6 Mbit |
| <Bambi-H.263, H.263, 28.8 Kbit> |

In step 120, the process discards the formats (e.g., tuples) that exceed the available bitrate on the client system. Of the remaining formats, in step 122, the process finds the format/player combination that has the highest priority. In step 124, the process then launches the selected player with the named asset.

For example, assume that a user has tried to play the composite asset "Bambi" set forth in FIG. 10. In case one, assume that the available bit rate is 5 Mbits per second. Based on the priority list above, the process would pick <Bambi-mpeg1, MPEG-1, 1.5 Mbit> and would then launch the player "/usr/mbase/sbin/optiplayer Bambi-mpeg1". Ijn a second case, assume that the available bit rate is 10 Mbits per second. Based on the above priority list, the process would pick <Bambi-mpeg2, MPEG-2, 6 Mbit> and would then launch the player "/usr/mbase/sbin/optiplayer Bambi-mpeg2". Thirdly, assume that the available bit rate is 1 Mbit per second. Based on the priority list above, the process would pick <Bambi-H.263, H.263, 28.8 Kbit> and would then launch the player "/usr/mbase/sbin/lbrplayer Bambi-H.263".

As a further enhancement and as mentioned above, the above description can apply to live feeds, for example where a source is live encoded and multicast over the network, as well as files installed on a media server. In the case of a live feed, the headers can be scanned from a packet stream instead of requiring that the headers be stored on a media server. This can then be used to process the live feed in an analogous manner. In this case, there is no installed asset and hence no content descriptors are stored on the media server. In one embodiment, the types of complex assets supported include parallel assets, and clips and sequences are not supported.

Although the present invention has been described in detail, it should be understood that various changes, substitutions and alterations can be made thereto without departing from the spirit and scope of the invention as defined by the appended claims.

What is claimed is:

1. A method for playback of a media file from a media server, comprising:
   receiving header information associated with a complex asset, said complex asset comprising a subset or combination of single bitstream assets, the header information comprising information for initializing a decoder for playback of the complex asset;
   creating artificial headers, characterized in that said artificial headers are separated from said media file, for the complex asset using the header information;
   receiving a digital packet stream for the complex asset and passing the digital packet stream to the decoder for playback; and
   injecting artificial headers during playback as appropriate for initializing the decoder for playback of the complex asset.

2. The method of claim 1, wherein the complex asset comprises a clip asset.

3. The method of claim 1, wherein the complex asset comprises a parallel asset.

4. The method of claim 1, wherein the complex asset comprises a sequential asset.

5. The method of claim 1, wherein the complex asset comprises a composite asset.

6. The method of claim 1, further comprising:
   storing the artificial headers;
   monitoring error conditions in the decoder during playback; and
   if there is a decoder shutdown, re-injecting the artificial headers as appropriate for initializing the decoder for playback of the complex asset.

7. The method of claim 1, wherein the header information and the digital packet stream are received across a local area network.

8. The method of claim 1, wherein the header information and the digital packet stream are received across the Internet.

9. The method of claim 1, wherein said digital packet stream is received from a storage device.

10. The method of claim 1, wherein said digital packet stream is received from a live feed.

11. The method of claim 1, wherein said header information is received from a database.

12. The method of claim 1, wherein the complex asset comprises a composite asset and said composite asset comprises:
 a name uniquely identifying the composite asset;
 a first associated asset encoding a media title in a first format; and
 a second associated asset encoding the media title in a second, different format; and
 said method further comprises:
  invoking a process on said media server to obtain format information for said composite asset;
  receiving a list of formats for the composite asset;
  discarding the formats that exceed an available bit rate;
  selecting, from remaining formats, a format and player combination that has a highest priority; and
  launching the selected player to playback a selected associated asset in said selected format.

13. The method of claim 12, wherein the format information comprises a list of tuples each holding a name, a format and a bit rate for one of the first or second associated assets.

14. The method of claim 12, wherein said launching further comprises requesting the selected associated asset from the media server.

15. The method of claim 12, wherein the first format is MPEG-1 and the second format is MPEG-2.

16. A computer program product comprising a media control application capable of directing a client system to:
 receive header information associated with a complex asset, the header information comprising information for initializing a decoder for playback of the complex asset;
 create artificial headers for the complex asset using the header information, the artificial headers characterized in that they are separate from a media file with which the header is typically located;
 receive a digital packet stream for the complex asset and passing the digital packet stream to the decoder for playback; and
 inject artificial headers during playback as appropriate for initializing the decider for playback of the complex asset.

* * * * *